(12) United States Patent
Lin et al.

(10) Patent No.: US 7,746,017 B2
(45) Date of Patent: Jun. 29, 2010

(54) FAN DRIVING SYSTEM WITH SAFE DRIVING CURRENT SWITCHING

(75) Inventors: Kai-Ping Lin, Hsinchu (TW); Tsung-Jen Lin, Hsinchu (TW)

(73) Assignee: Fitipower Integrated Technology, Inc., Miaoli County (TW)

( * ) Notice: Subject to any disclaimer, the term of this patent is extended or adjusted under 35 U.S.C. 154(b) by 247 days.

(21) Appl. No.: 12/104,664

(22) Filed: Apr. 17, 2008

(65) Prior Publication Data

US 2009/0085506 A1      Apr. 2, 2009

(30) Foreign Application Priority Data

Sep. 27, 2007    (CN) .................... 2007 1 0152351

(51) Int. Cl.
    *H02P 1/00*    (2006.01)
(52) U.S. Cl. .................. 318/519; 318/504; 318/434
(58) Field of Classification Search .......... 388/804; 318/400.23, 519, 434, 432, 433; 307/149
    See application file for complete search history.

(56) References Cited

U.S. PATENT DOCUMENTS

2007/0222290 A1*   9/2007   Matsuhashi ................. 303/199

\* cited by examiner

*Primary Examiner*—Karen Masih
(74) *Attorney, Agent, or Firm*—Andrew C. Cheng (57) ABSTRACT

An exemplary fan driving system includes a driving device and a MOSFET group. The driving device includes a first adjustable resistor connected between its first voltage signal input terminal and ground, and a second adjustable resistor connected between its second voltage signal input terminal and ground. The MOSFET group includes two N-type MOSFETs and two P-type MOSFETs. The first terminal of the fan is connected to an anode of D1 and a cathode of D3. The second terminal of the fan is connected to an anode of D2 and a cathode of D4. Cathodes of the D1 and D2 are configured to connect a supply voltage. Anodes of the D3 and D4 both are grounded. The fan driving system can effectively discharge off the residual current in the coil of the fan at the moment of the MOSFET group being switched off.

5 Claims, 12 Drawing Sheets

FAN DRIVING SYSTEM WITH SAFE DRIVING CURRENT SWITCHING

BACKGROUND

1. Technical Field

The present invention generally relates to electrical driving systems and driving current switching in such driving systems.

2. Description of Related Art

Figure 10:
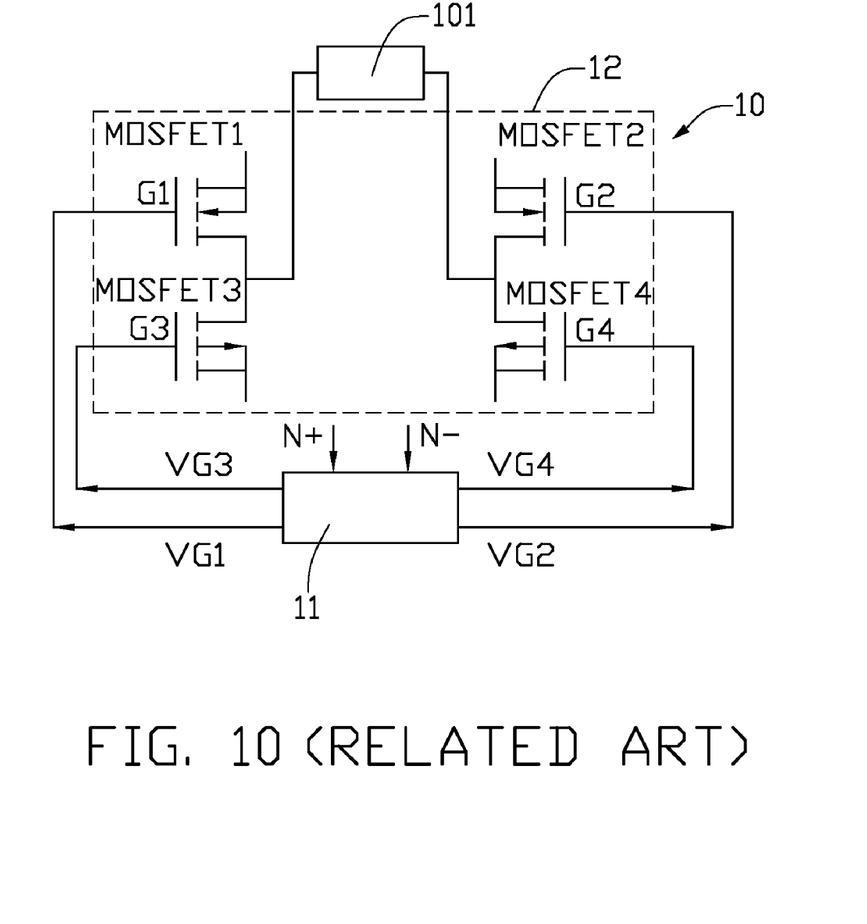
FIG. 10 is a circuit diagram of a conventional fan driving system.
Figure 11:
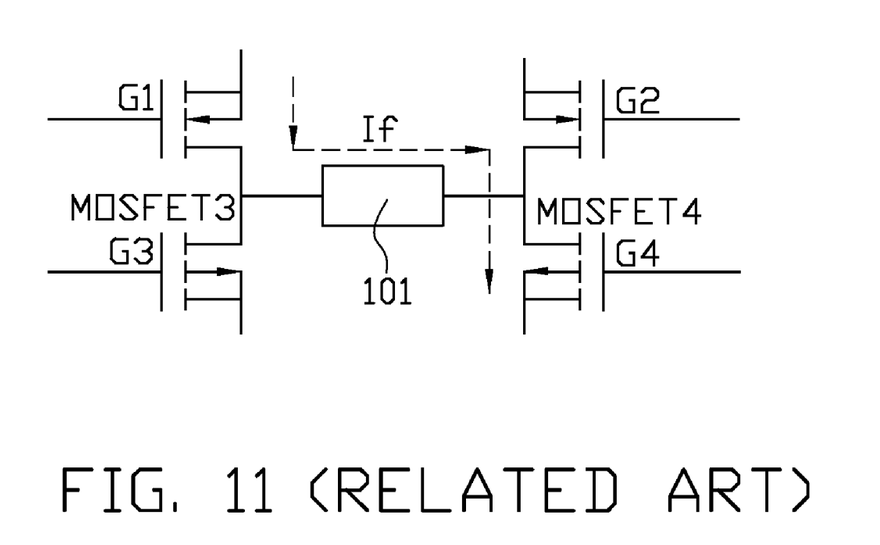
FIG. 11 shows an operational state of the fan driving system of FIG. 10, illustrating a forward driving current.
Figure 12:
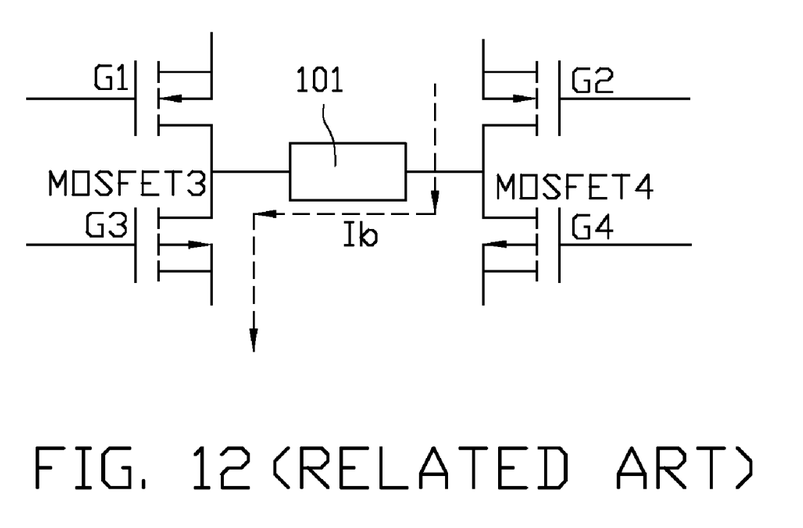
FIG. 12 shows another operational state of the fan driving system of FIG. 10, illustrating a reverse driving current.

Referring to FIG. 10, this shows a conventional fan driving system 10 adapted to drive a fan 101. The driving system 10 and fan 101 are used in a computer. The fan driving system 10 includes a driving device 11 and a MOSFET (Metal Oxide Semiconductor Field Effect Transistor) group 12. The MOSFET group 12 includes a first MOSFET (i.e., MOSFET1), a second MOSFET (i.e., MOSFET2), a third MOSFET (i.e., MOSFET3), and a fourth MOSFET (i.e., MOSFET4). The driving device 11 is configured for receiving a set of Hall sensing signals N+ and N− from a Hall sensor (not shown) of the fan 101, and outputting a first driving signal VG1, a second driving signal VG2, a third driving signal VG3, and a fourth driving signal VG4 respectively to a gate G1 of the first MOSFET, a gate G2 of the second MOSFET, a gate G3 of the third MOSFET, and a gate G4 of the fourth MOSFET. Thereby, the MOSFETs in each pair of coupled MOSFETs of the MOSFET group 12 are selectably switched on simultaneously. That is, the first MOSFET and the fourth MOSFET are selectably switched on simultaneously, or the second MOSFET and the third MOSFET are selectably switched on simultaneously. Referring also to FIG. 11, after the first MOSFET with the fourth MOSFET are switched on and thereby enabled, a driving current If flows through the fan 101 via an electrical loop constituted by the driving device 11, the first MOSFET and the fourth MOSFET. Referring also to FIG. 12, the second MOSFET and the third MOSFET are then switch on and thereby enabled, and another driving current Ib flows through the fan 101 via an electrical loop constituted by the driving device 11, the second MOSFET and the third MOSFET. The driving current Ib flows in a direction opposite to the direction in which the driving current If flows. The driving currents If and Ib alternately flow through the fan 101, thereby driving the fan 101 to rotate.

A rotational speed of the fan 101 is determined by the levels of the driving currents If and Ib. In particular, the higher the levels of the driving currents If and Ib, the faster the rotational speed of the fan 101. However, the relationship between the levels of the driving currents If and Ib and the rotational speed is non-linear. Therefore, in order to control the rotational speed of the fan 101, it is necessary to appropriately regulate the levels of the driving currents If and Ib. A conventional mode for regulating the driving currents If and Ib is a PWM (Pulse Width Modulation) driving mode, wherein the rotational speed of the fan 101 can be regulated by simply controlling a pulse width of the PWM waves corresponding to the driving currents If and Ib.

A noise usually is generated while the fan 101 rotates, due to the low switching frequency between the driving currents If and Ib. Accordingly, in order to suppress the generation of noise, one approach is to set the switching frequency between the driving currents If and Ib to be higher than 25 kilohertz (KHz).

Typically, during the process of switching the driving currents If and Ib, a residual current stored in a coil of the fan 101 cannot be fully discharged in time. This is due to all of the first MOSFET, the second MOSFET, the third MOSFET and the fourth MOSFET being switched off. Therefore, at the moment of switching, a peak voltage in the coil of the fan 101 is excessively high. This is liable to result in the fan driving system 10 being damaged and disabled.

What is needed, therefore, is a fan driving system for a fan which can overcome the above-described shortcomings.

SUMMARY

A fan driving system for driving a fan is provided. The fan includes a first terminal and a second terminal. The fan driving system includes a driving device and a MOSFET group. The driving device is configured (i.e., structured and arranged) for receiving Hall sensing signals N+ and N− outputted from the fan. The driving device includes a first driving signal output terminal, a second driving signal output terminal, a third driving signal output terminal, a fourth driving signal output terminal, a first voltage signal input terminal, a second voltage signal input terminal, a first adjustable resistor connected between the first voltage signal input terminal and ground and configured for adjusting a first voltage signal on the first adjustable resistor which is coupled to the first voltage signal input terminal, and a second adjustable resistor connected between the second voltage signal input terminal and ground and configured for adjusting a second voltage signal on the second adjustable resistor which is coupled to the second voltage signal input terminal. The MOSFET group includes a first N-type MOSFET, a second N-type MOSFET, a third P-type MOSFET, a fourth P-type MOSFET, a first diode, a second diode, a third diode and a fourth diode. A drain of the first N-type MOSFET and a drain of the third P-type MOSFET are connected to the first terminal of the fan. A drain of the second N-type MOSFET and a drain of the fourth P-type MOSFET are connected to the second terminal of the fan. Gates of the first N-type MOSFET, the second N-type MOSFET, the third P-type MOSFET and the fourth P-type MOSFET are respectively connected to the first driving signal output terminal, the second driving signal output terminal, the third driving signal output terminal and the fourth driving signal output terminal. On-off states of the first N-type MOSFET are respectively synchronous with on-off states of the fourth P-type MOSFET. On-off states of the second N-type MOSFET are respectively synchronous with on-off states of third P-type MOSFET. The on-off states of the first N-type and fourth P-type MOSFETs are synchronous with but the reverse of the on-off states of the second N-type and third P-type MOSFETs. An anode of the first diode and a cathode of the third diode are configured to be connected to the first terminal of the fan. An anode of the second diode and a cathode of the fourth diode are configured to be connected to the second terminal of the fan. A cathode of the first diode and a cathode of the second diode are configured to connect to a power supply. An anode of the third diode and an anode of the fourth diode are configured to be grounded.

Advantageously, the fan driving system can effectively fully discharge residual current in a coil of the fan by the first, second, third and fourth diode at the moment all of the first N-type MOSFET, the second N-type MOSFET, the third P-type MOSFET and the fourth P-type MOSFET are switched off.

Other novel features and advantages will become more apparent from the following detailed description when taken in conjunction with the accompanying drawings.

BRIEF DESCRIPTION OF THE DRAWINGS

Many aspects of the present fan driving system can be better understood with reference to the following drawings.

The components in the drawings are not necessarily drawn to scale, the emphasis instead being placed upon clearly illustrating the principles of the present fan driving system.

Corresponding reference characters indicate corresponding parts throughout the drawings. The exemplifications set out herein illustrate at least one preferred embodiment of the present fan driving system, in one form, and such exemplifications are not to be construed as limiting the scope of the fan driving system in any manner.

DETAILED DESCRIPTION OF THE INVENTION

Reference will now be made to the drawings to describe at least one embodiment of the present fan driving system.

Figure 1:
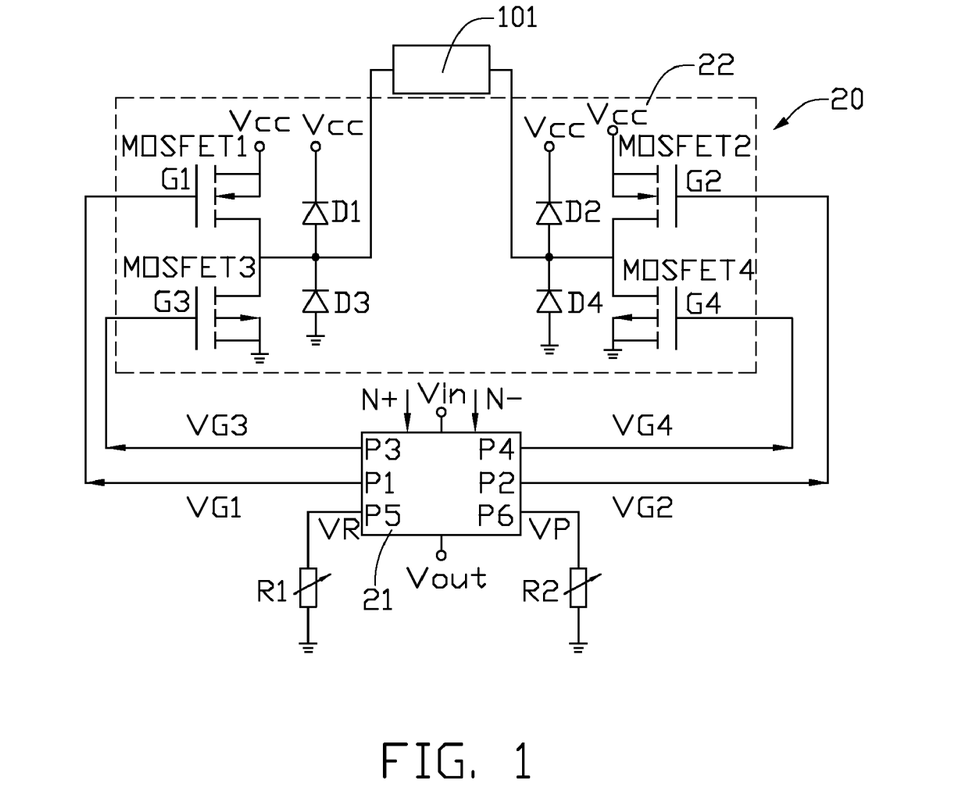
FIG. 1 is a circuit diagram of a fan driving system in accordance with one embodiment of the present invention, the fan driving system including a driving device.

Referring to FIG. 1, a fan driving system 20 in accordance with one embodiment of the present invention is shown. The fan driving system 20 is configured for driving a fan 101. The fan 101 includes a first terminal and a second terminal. The fan driving system 20 includes a driving device 21, a MOSFET group 22, a first adjustable resistor R1, and a second adjustable resistor R2.

The driving device 21 includes an input terminal configured for receiving a Hall sensing signal N+, and an input terminal configured for receiving a Hall sensing signal N−. The input terminals are configured to respectively receive the Hall sensing signals N+ and N− from a Hall sensor (not shown) provided in the fan 101. It can be understood that the Hall sensing signals N+ and N− can cooperatively confirm a position of a magnet (not shown) of the fan 101. The driving device 21 also includes a group of driving signal output terminals P1, P2, P3, P4, a voltage signal VR input terminal P5, and a voltage signal VP input terminal P6. The first adjustable resistor R1 is connected between the first voltage signal VR input terminal P5 and ground, and the second adjustable resistor R2 is connected between the second voltage signal VP input terminal P6 and ground.

The MOSFET group 22 includes a first MOSFET (i.e., MOSFET1), a second MOSFET (i.e., MOSFET2), a third MOSFET (i.e., MOSFET3), and a fourth MOSFET (i.e., MOSFET4). In the illustrated embodiment, the MOSFET1 and the MOSFET2 are N-type MOSFETs, and the MOSFET3 and the MOSFET4 are P-type MOSFETs. A drain of the MOSFET1 and a drain of the MOSFET3 are connected to the first terminal of the fan 101, and a drain of the MOSFET2 and a drain of the MOSFET4 are connected to the second terminal of the fan 101. A source of the MOSFET1 and a source of the MOSFET2 are configured to connect to a power supply Vcc. A source of the MOSFET3 and a source of the MOSFET4 are grounded.

The MOSFET group 22 further includes four diodes D1, D2, D3, D4. An anode of the diode D1 and a cathode of the diode D3 are connected to the first terminal of the fan 101. An anode of the diode D2 and a cathode of the diode D4 are connected to the second terminal of the fan 101. A cathode of the diode D1 and a cathode of the diode D2 are adapted to connect to the power supply Vcc. An anode of the diode D3 and an anode of the diode D4 are grounded.

Four driving signals VG1, VG2, VG3, VG4 are respectively outputted from the driving signal output terminals P1, P2, P3, P4 to respective gates G1, G2, G3, G4 of the MOSFET1, MOSFET2, MOSFET3, MOSFET4, so as to control on-off states of the respective MOSFET1, MOSFET2, MOSFET3, MOSFET4.

Figure 2:
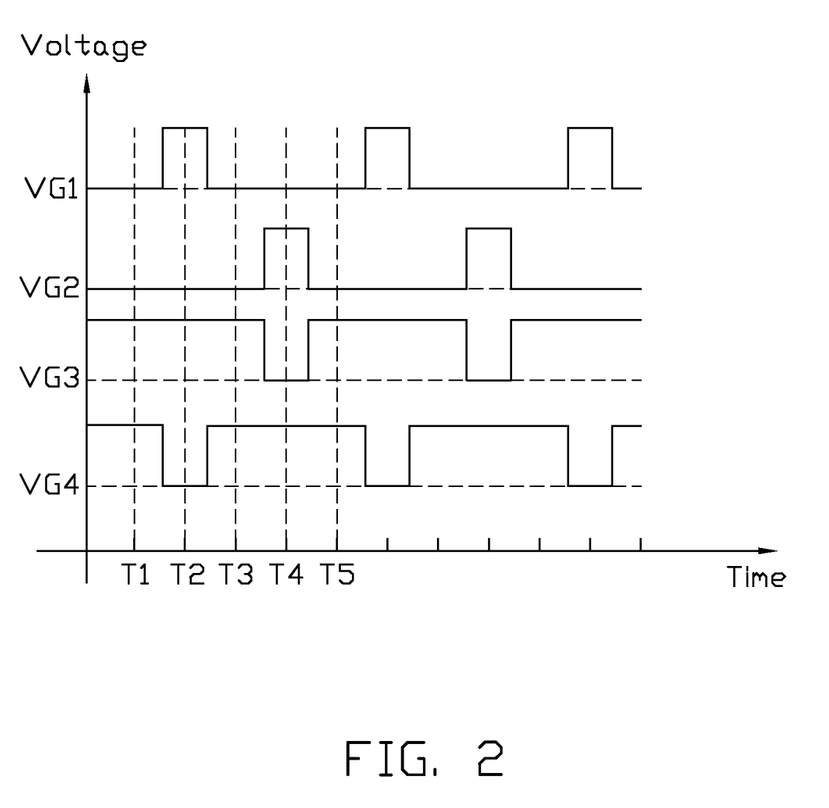
FIG. 2 is a waveform chart of driving signals generated from the driving device of the fan driving system of FIG. 1.
Figure 3:
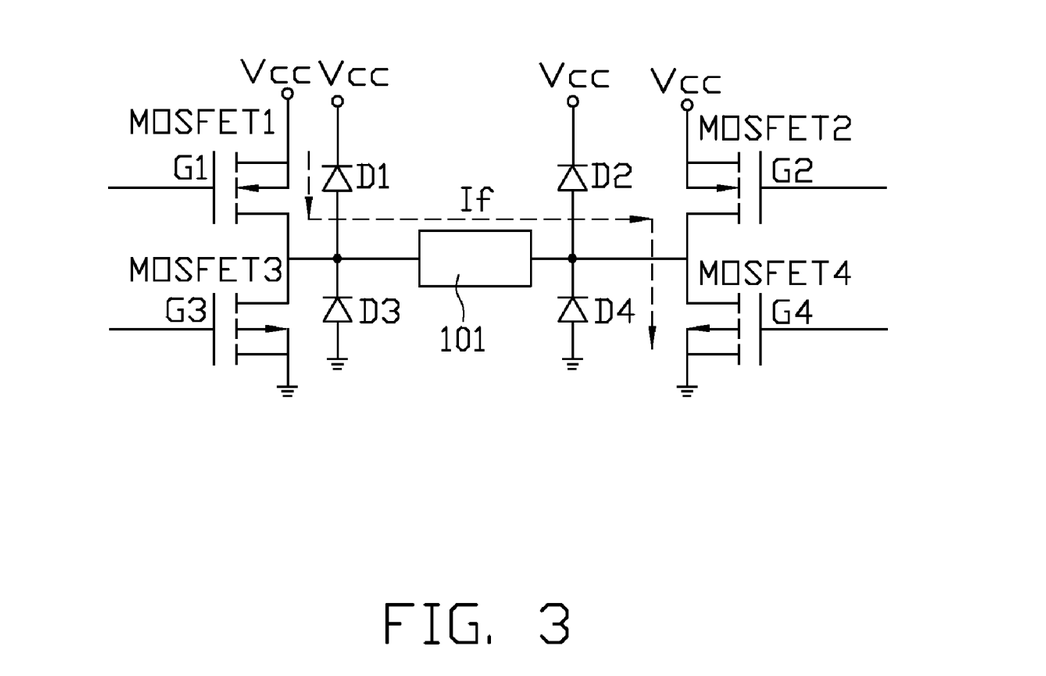
FIG. 3 shows an operational state of the fan driving system of FIG. 1, illustrating a forward driving current.
Figure 4:
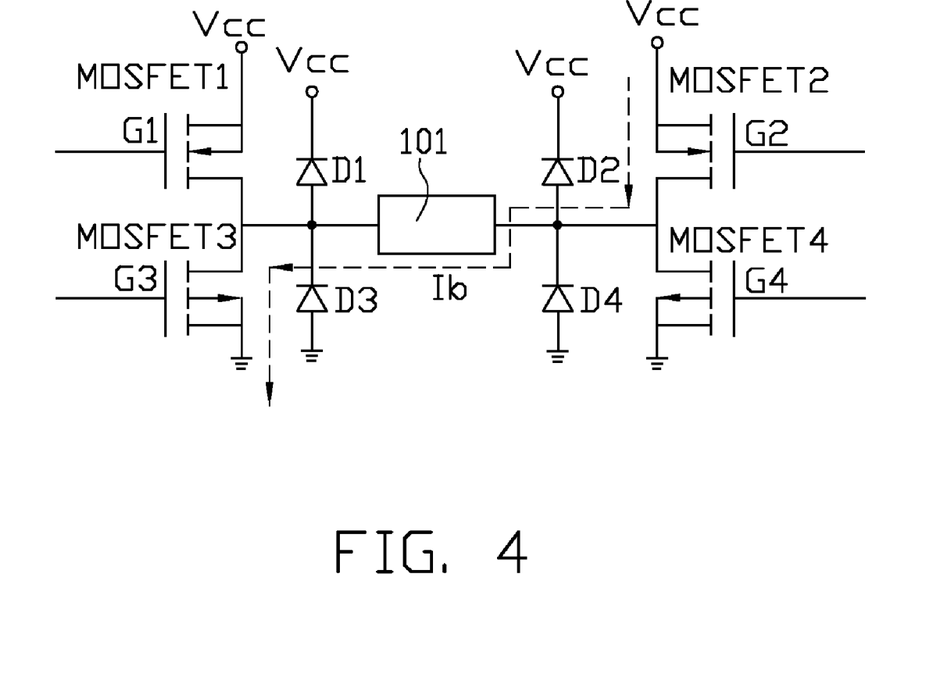
FIG. 4 shows another operational state of the fan driving system of FIG. 1, illustrating a reverse driving current.

Referring to FIG. 2, a waveform chart of the driving signals VG1, VG2, VG3, VG4 is shown. At the time T2, the driving signal VG1 is logic "high", the driving signal VG2 is logic "low", the driving signal VG3 is logic "high", and the driving signal VG4 is logic "low". Therefore, referring also to FIG. 3, the MOSFET1 and the MOSFET4 are switched on, the MOSFET2 and the MOSFET3 are switched off, and a driving current If flows through the fan 101 via an electrical loop constituted by the driving device 21, the MOSFET1, the MOSFET4 and the fan 101. At the time T4, the driving signal VG1 is logic "low", the driving signal VG2 is logic "high", the driving signal VG3 is logic "low", and the driving signal VG4 is logic "high". Therefore, referring also to FIG. 4, the MOSFET2 and the MOSFET3 are switched on, the MOSFET1 and the MOSFET4 are switched off, and a driving current Ib flows through the fan 101 via an electrical loop constituted by the driving device 21, the MOSFET2, the MOSFET3 and the fan 101. The time T1 corresponds to the driving signals outputted from the driving device 21 being initially provided to the MOSFET group 22, the time T3 corresponds to the driving current If being switched to the driving current Ib, and the time T5 that corresponds to the driving current Ib being switched to the driving current If. At each of the times T1, T3, T5, the driving signal VG1 is logic "low", the driving signal VG2 is logic "low", the driving signal VG3 is logic "high", and the driving signal VG4 is logic "high"; therefore all of the MOSFET1, MOSFET2, MOSFET3 and MOSFET4 are switched off. Accordingly, the MOSFET1 and the MOSFET3 are not switched on at the same time, and the MOSFET2 and the MOSFET4 are not switched on at the same time. Therefore the occurrence of an excessively high current flowing through the MOSFET1 and MOSFET3 is effectively avoided, and the occurrence of an excessively high current flowing through the MOSFET2 and MOSFET4 is effectively avoided. The switching processes occurring in the time intervals T1 to T2, T2 to T3, T3 to T4, and T4 to T5 are determined by the Hall sensing signals N+ and N− received by the driving device 21.

Figure 5:
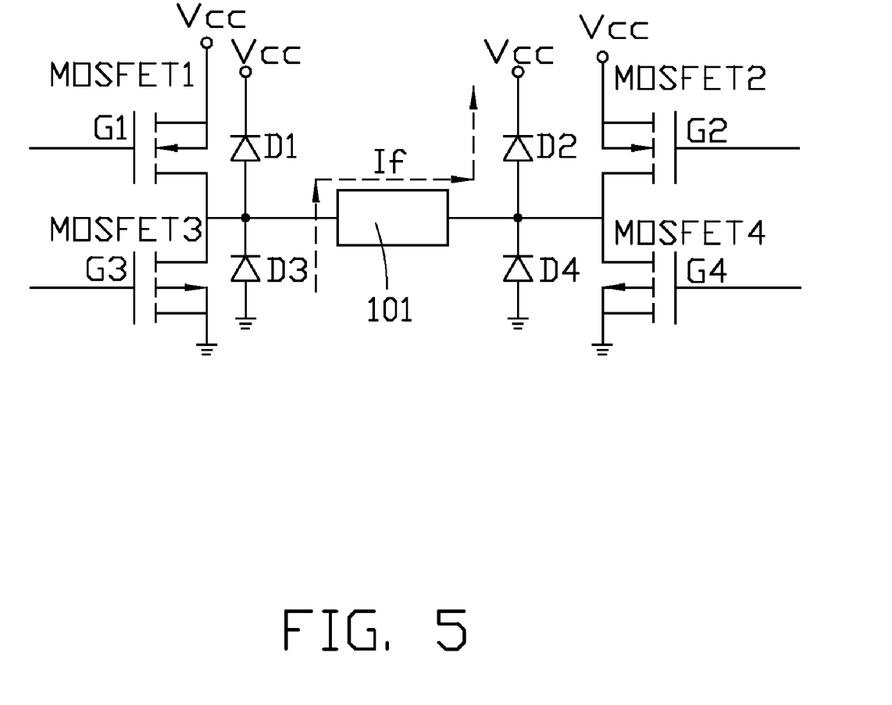
FIG. 5 shows an operational state of the fan driving system similar to the operational state shown in FIG. 3, but illustrating a residual forward driving current being discharged.

Referring also to FIG. 5, at the time T3, the MOSFET1 and MOSFET4 are switched off, and the MOSFET2 and MOSFET3 remain in an off state, so that a residual driving current If stored in a coil of the fan 101 is discharged via an electrical loop constituted by the diode D2, the fan 101 and the diode D3. Therefore, the generation of a high peak voltage in the coil of the fan 101 at the moment of the driving current If being switched to the driving current Ib can be avoided.

Figure 6:
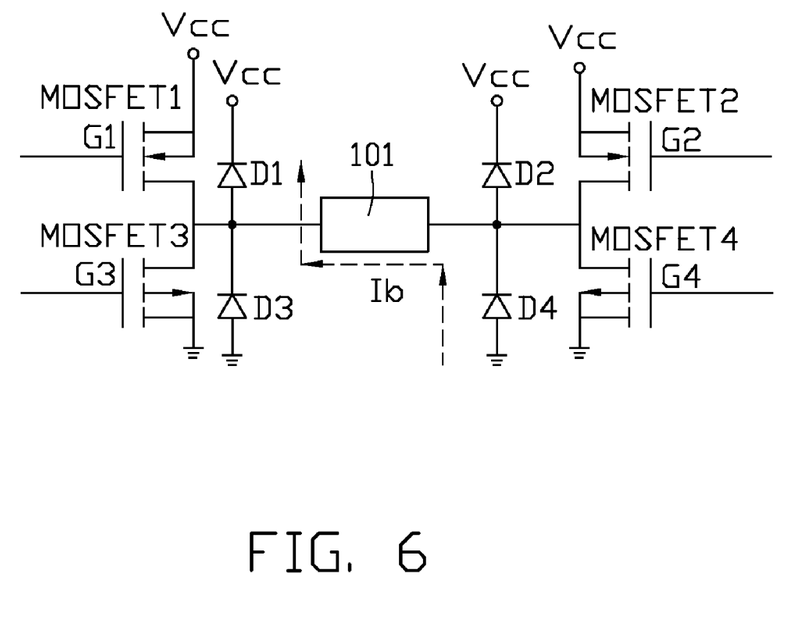
FIG. 6 shows an operational state of the fan driving system similar to the operational state shown in FIG. 4, but illustrating a residual reverse driving current being discharged.

Referring also to FIG. 6, at the time T5, the MOSFET2 and MOSFET3 are switched off, and the MOSFET1 and MOSFET4 remain in an off state, so that a residual driving current Ib stored in the coil of the fan 101 is discharged via an electrical loop constituted by the diode D1, the fan 101 and the diode D4. Therefore, the generation of a high peak voltage in the coil of the fan 101 at the moment of the driving current Ib being switched to the driving current If can be avoided.

Figure 7:
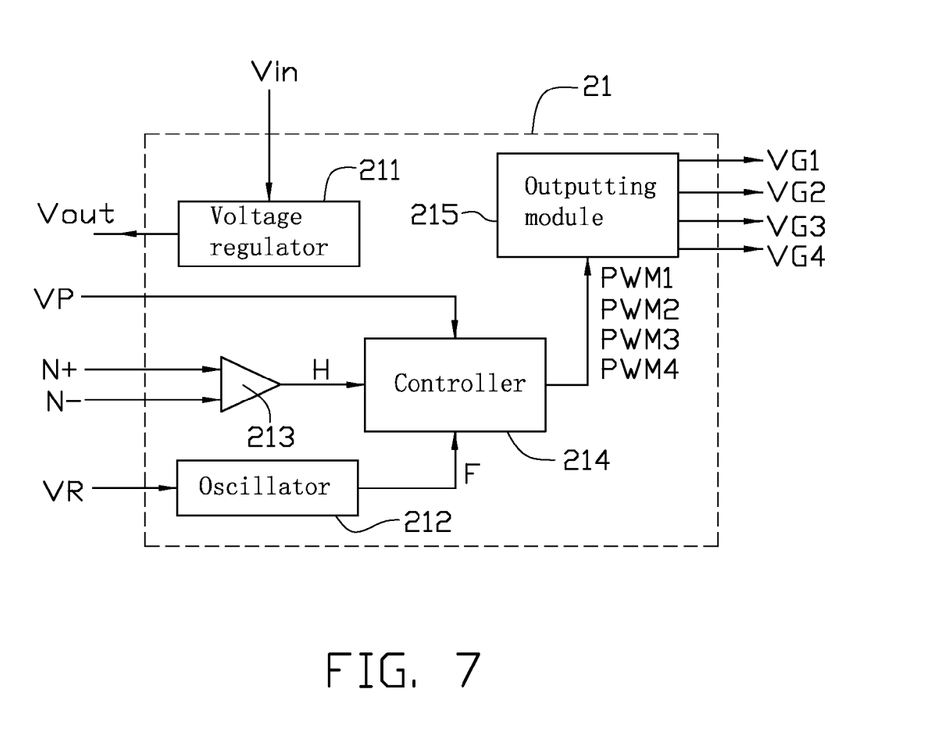
FIG. 7 shows a circuit diagram of the driving device of the fan driving system of FIG. 1, the driving device including a controller.

Referring to FIG. 7, the driving device 21 includes a voltage regulator 211, an oscillator 212, a comparator 213, a controller 214, and an outputting module 215.

The voltage regulator 211 is configured for transforming an input voltage Vin and outputting a corresponding output voltage Vout to one function module outside of the driving device 21. For example, the voltage regulator 211 is configured for transforming an input voltage 5V to be an output voltage 3.3V; or for transforming an input voltage 3.3V to be an output voltage 2.5V.

The oscillator 212 is configured for outputting an oscillating frequency signal F to the controller 214 by adjusting/regulating an oscillating frequency itself according to the voltage signal VR. The oscillating frequency of the oscillator 212 can be adjusted by the first adjustable resistor R1. That is, the oscillator 212 can output different oscillating frequency signals F according to the voltage signal VR.

The comparator 213 is configured for receiving the Hall sensing signals N+ and N− and outputting a comparing signal H to the controller 214.

The controller 214 receives the voltage signal VP, the comparing signal H and the oscillating frequency signal F, and outputs pulse signals PWM1, PWM2, PWM3 and PWM4 to the outputting module 215. The voltage signal VP can be adjusted by the second adjustable resistor R2. Pulse widths of the respective PWM1, PWM2, PWM3 and PWM4 pulse signals are determined by the voltage signal VP. The controller 214 acquires a position of the magnet (not shown) in the fan 101 based on the comparing signal H and then switches the on-off states of the MOSFET1 MOSFET2, MOSFET3 and the MOSFET4. The controller 214 changes frequencies of the respective PWM1, PWM2, PWM3 and PWM4 pulse signals based on the received oscillating frequency signal F.

Figure 8:
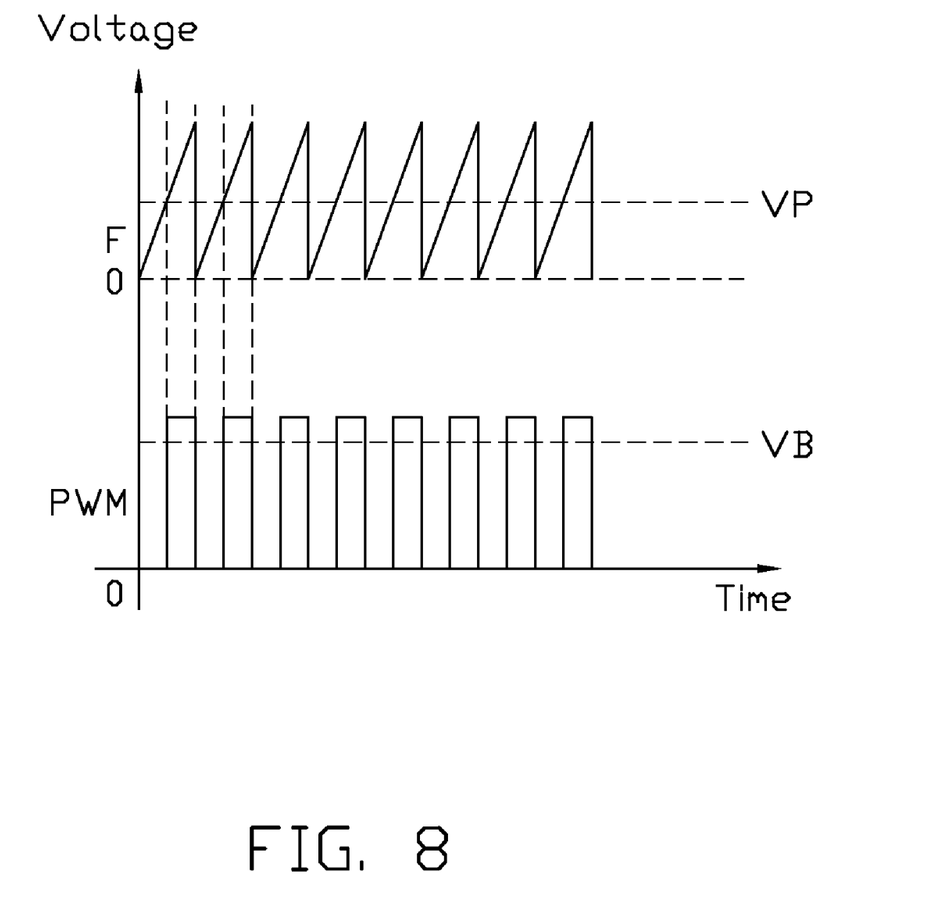
FIG. 8 is a waveform chart of an oscillating frequency signal and a pulse signal received by the controller of FIG. 7, illustrating a relationship between the pulse signal and the oscillating frequency signal.

Referring also to FIG. 8, when the oscillating frequency signal F is greater than the voltage signal VP, the PWM wave is logic "high"; whereas when the oscillating frequency signal F is lower than the voltage signal VP, the PWM wave is logic "low". The controller 214 controls the switching frequencies for switching the on-off states of the respective MOSFET1, MOSFET2, MOSFET3, MOSFET4 by changing the frequencies of the respective PWM1, PWM2, PWM3, PWM4 pulse signals. Because the frequencies of the PWM1, PWM2, PWM3, PWM4 pulse signals can be adjusted by the first adjustable resistor R1, the switching frequency between the driving currents If and Ib can correspondingly be controlled by the first adjustable resistor R1. In particular, the switching frequency can be controlled to be greater than 25 KHz. In the present embodiment, the switching frequency between the driving currents If, Ib can be controlled to be greater than 30 KHz, so that the noise of the fan 101 can be suppressed or even eliminated.

Figure 9:
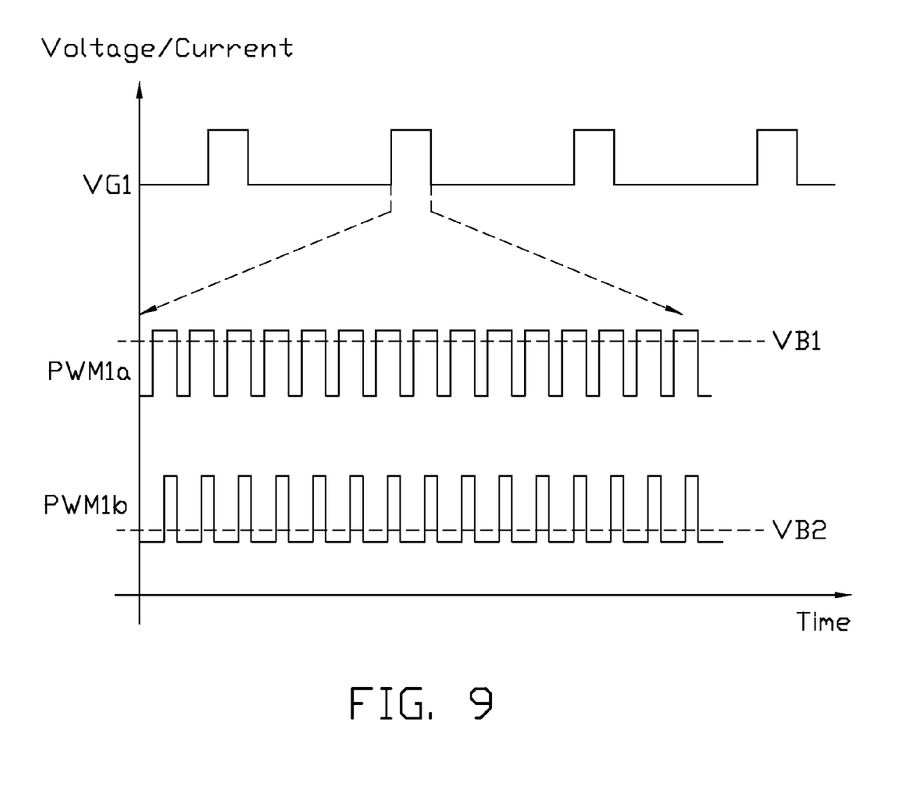
FIG. 9 is a waveform chart of a first driving signal generated from the driving device of the fan driving system of FIG. 1, and two types of pulse signals corresponding to a duty cycle of the first driving signal.

Referring to FIG. 9, when the driving signal VG1 is logic "high", the MOSFET1 is switched on, and each duty cycle of the driving signal VG1 can be represented by a first type PWM wave PWM1a. An average current of the PWM1a wave is VB1, which can be used to directly control the rotational speed of the fan 101. Alternatively, each duty cycle of the driving signal VG1 can be represented by a second type PWM wave PWM1b. An average current of the PWM1b wave is VB2, which can be used to directly control the rotational speed of the fan 101. As shown in FIG. 9, the pulse width of the PWM1b wave is less than that of the PWM1a wave, so that the level of the average current VB1 is greater than that of the average current VB2. Therefore the rotational speed of the fan 101 when the duty cycle of the driving signal VG1 is represented by the first type PWM wave PWM1a is quicker than that when the duty cycle of the driving signal VG1 is represented by the second type PWM wave PWM1b. It can be understood that each duty cycle of the driving signals VG2, VG3, VG4 also can be represented by the first type PWM wave PWM1a or the second type PWM wave PWM1b. However, each duty cycle of the driving signals VG1 and VG4 must be represented by simultaneous PWM waves, and each duty cycle of the driving signals VG2 and VG3 must be represented by simultaneous PWM waves. Thus, the rotational speed of the fan can be controlled by adjusting the pulse widths of the driving signals VG1, VG2, VG3, VG4. In addition, the pulse widths of the PWM1, PWM2, PWM3 and PWM4 pulse signals are determined by the voltage signal VP, and the voltage signal VP can be adjusted by the second adjustable resistor R2. That is, the rotational speed of the fan can further be controlled by adjusting the second adjustable resistor R2.

The outputting module 215 is configured for receiving the pulse signals PWM1, PWM2, PWM3, PWM4, and outputting the corresponding driving signals VG1, VG2, VG3, VG4 to the gates G1, G2, G3, G4 of the respective MOSFET1, MOSFET2, MOSFET3, MOSFET4.

It is to be understood that the above-described embodiments are intended to illustrate rather than limit the invention. Variations may be made to the embodiments without departing from the spirit of the invention as claimed. The above-described embodiments are intended to illustrate the scope of the invention and not restrict the scope of the invention.

What is claimed is:

1. A fan driving system for driving a fan, the fan comprising a first terminal and a second terminal, the fan driving system comprising:

a driving device configured for receiving Hall sensing signals N+ and N− outputted from the fan, the driving device comprising:

a first driving signal output terminal, a second driving signal output terminal, a third driving signal output terminal, a fourth driving signal terminal; and a Metal Oxide Semiconductor Field Effect Transistor (MOSFET) group, comprising a first N-type MOSFET, a second N-type MOSFET, a third P-type MOSFET, a fourth P-type MOSFET, a first diode, a second diode, a third diode, and a fourth diode, wherein a drain of the first N-type MOSFET and a drain of the third P-type MOSFET are connected to the first terminal of the fan, a drain of the second N-type MOSFET and a drain of the fourth P-type MOSFET are connected to the second terminal of the fan, gates of the first N-type MOSFET, the second N-type MOSFET, the third P-type MOSFET and the fourth P-type MOSFET are respectively connected to the first driving signal output terminal, the second driving signal output terminal, the third driving signal output terminal and the fourth driving signal terminal, on-off states of the first N-type MOSFET are respectively synchronous with on-off states of the fourth P-type MOSFET, on-off states of the second N-type MOSFET are respectively synchronous with on-off states of the third P-type MOSFET, the on-off states of the first N-type and fourth P-type MOSFETs are synchronous with but the reverse of the on-off states of the second N-type and third P-type MOSFETs, an anode of the first diode and a cathode of the third diode are configured to be connected to the first terminal of the fan, an anode of the second diode and a cathode of the fourth diode are configured to be connected to the second terminal of the fan, a cathode of the first diode and a cathode of the second diode are configured to connect to a power supply, and an anode of the third diode and an anode of the fourth diode are configured to be grounded.

2. The fan driving system of claim 1, wherein a source of the first N-type MOSFET and a source of the second N-type MOSFET are configured to connect to the power supply, and a source of the third P-type MOSFET and a source of the fourth P-type MOSFET are configured to be grounded.

3. The fan driving system of claim 1, further comprising a first adjustable resistor, the driving device further comprising a first voltage signal input terminal, the first adjustable resistor configured to be connected between the first voltage signal input terminal and ground and configured for adjusting a first voltage signal to the first voltage signal input terminal.

4. The fan driving system of claim 3, further comprising a second adjustable resistor, the driving device further comprising a second voltage signal input terminal, the second adjustable resistor configured to be connected between the second voltage signal input terminal and ground and configured for adjusting a second voltage signal to the second voltage signal input terminal.

5. The fan driving system of claim 4, wherein the driving device further comprises a voltage regulator, an oscillator, a comparator, a controller, and an outputting module; the voltage regulator is configured for adjusting an input voltage inputted therein and outputting a corresponding output voltage; the oscillator is configured for receiving the first voltage signal and outputting an oscillating frequency signal to the controller; the comparator is configured for receiving the Hall sensing signals N+ and N− and outputting a comparing signal to the controller; the controller is configured for receiving the second voltage signal, the comparing signal, and the oscillating frequency signal and outputting a plurality of pulse signals to the outputting module; and the outputting module is configured for receiving the pulse signals and outputting a first driving signal, a second driving signal, a third driving signal and a fourth driving signal respectively to gates of the first N-type MOSFET, the second N-type MOSFET, the third P-type MOSFET and the fourth P-type MOSFET.

* * * * *